2,860,108
POLYMERIC SULFONAMIDO ALKYL VINYL DERIVATIVES

Sidney Melamed, Philadelphia, Pa., assignor to Rohm & Haas Company, Philadelphia, Pa., a corporation of Delaware No Drawing. Application December 8, 1954
Serial No. 474,002

5 Claims. (Cl. 260—2.1)

This invention relates to a process for producing novel polymers of aminoalkyl vinyl ether derivatives, and it is especially concerned with the homopolymers and copolymers of aminoalkyl vinyl ether derivatives of high molecular weight.

Aminoalkyl vinyl ethers cannot be polymerized alone, or with a minor proportion of another type of monoethylenically or polyethylenically unsaturated monomer, by means of such initiators as benzoyl peroxide and related peroxygen compounds. While azo catalysts can be used to polymerize aminoalkyl vinyl ethers, a large proportion, on the order of 10% to 15% based on the weight of the monomer, of the initiator is required and the highest molecular weight homopolymers obtainable have an average of about 1000 to 2000 molecular weight. Copolymers may be made of somewhat higher weight depending upon the proportion of monomer or monomers of other than vinyl ether type used. When attempt is made to copolymerize the aminoalkyl vinyl ether with a cross-linking monomer, such as divinylbenzene, there is insufficient copolymerization of the amine with the cross-linking agent to convert the copolymer to insoluble form, that is, to a form insoluble in both aqueous and organic solvent systems.

Also, certain substituted aminoalkyl vinyl ethers, such as those in which the N atom carries a polymerization-inhibiting group, such as a benzyl, substituted benzyl, or a nitrophenyl group, polymerize in the presence of an azo catalyst only to a small extent of 5% to 20% to low average molecular weights of about 1000.

It is a primary object of the present invention to produce polymers of aminoalkyl vinyl ethers by a process adapted to provide such polymers of any molecular weight desired including higher molecular weights of 5000 to 50,000 or more, whether the polymer is a homopolymer or a copolymer. An ancillary object is to provide a process capable of producing high molecular weight copolymers of cross-linked insoluble type from aminoalkyl vinyl ethers. Another object is to produce substituted aminoalkyl vinyl ether polymers of high or low molecular weight which have not heretofore been known and which cannot be obtained by simple or direct polymerization of corresponding monomers because of the instability of the monomers which either cyclize to destroy the vinyl unsaturation or hydrolyze at the ether linkage. Other objects and advantages will be apparent from the description thereof hereinafter.

In accordance with the present invention, an amidoalkyl vinyl ether is polymerized to the molecular weight desired and the resulting polymer is hydrolyzed to provide a poly(aminoalkyl vinyl ether). The amidoalkyl vinyl ether may be a carbonamidoalkyl vinyl ether or a carbamidoalkyl vinyl ether, the latter type of compound being known also as a ureidoalkyl vinyl ether. The amidoalkyl vinyl ethers that may be used in carrying out the process of the present invention are those having the structure of one of Formulas I and II:

(I) $\quad CH_2=CHOANRCONH_2$
(II) $\quad CH_2=CHOANRCOR'$ wherein A is an alkylene group of 2 to 3 carbon atoms of which at least two separate the adjoining O and N atoms, R is H or $CH_3$, and R' is H or an alkyl radical of 1 to 4 carbon atoms.

Specific compounds within the scope of Formulas I and II which may be used include the following:

$CH_2=CHOCH_2CH_2NHCONH_2$
$CH_2=CHOCH_2CH_2N(CH_3)CONH_2$
$CH_2=CHOCH_2CH_2CH_2NHCONH_2$
$CH_2=CHOCH_2CH_2CH_2N(CH_3)CONH_2$
$CH_2=CHOCH(CH_3)CH_2NHCONH_2$
$CH_2=CHOCH(CH_3)CH_2N(CH_3)CONH_2$
$CH_2=CHOCH_2CH(CH_3)NHCONH_2$
$CH_2=CHOCH_2CH(CH_3)N(CH_3)CONH_2$
$CH_2=CHOCH_2CH_2NHCOH$
$CH_2=CHOCH_2CH_2NHCOCH_3$
$CH_2=CHOCH_2CH_2NHCOC_2H_5$
$CH_2=CHOCH_2CH_2NHCOC_4H_9$
$CH_2=CHO(CH_2)_3NHCOH$
$CH_2=CHO(CH_2)_3NHCOCH_3$
$CH_2=CHOCH(CH_3)CH_2NHCOH$
$CH_2=CHOCH(CH_3)CH_2NHCOCH_3$

The amidoalkyl vinyl ethers are readily polymerized to produce homopolymers as well as copolymers having a wide range of molecular weights including molecular weights of 5000 to 50,000 or more. They may be polymerized in the presence of catalysts or initiators of the acyclic azo type. In such compound the —N=N— group is attached to aliphatic carbon atoms, at least one of which is tertiary. Typical azo catalysts are azodiisobutyronitrile, azodiisobutyramide, dimethyl (or diethyl or dibutyl) azodiisobutyrate, azobis($\alpha,\gamma$-dimethylvaleronitrile), azobis($\alpha$-methylbutyronitrile), azobis($\alpha$-methylvaleronitrile), dimethyl azobismethylvalerate, and the like. In these catalysts one of the carbons bonded to the tertiary carbon atoms has its remaining valences satisfied by at least one element from the class consisting of oxygen and nitrogen. Polymerization may be effected in bulk, in solution, or in emulsion systems. To effect polymerization the amidoalkyl vinyl ether and the acyclic azo catalyst are mixed directly or in the presence of an inert solvent and the mixture is maintained between 60° and 100° C. until the desired extent of polymerization is attained. For water-soluble amidoalkyl vinyl ethers water may serve as solvent, if desired. Other solvents include methanol, ethanol, isopropanol, butanol, dimethylformamide, benzene, toluene, ethyl acetate, etc. The amount of catalyst may be varied from about 0.1% to about 5% of the weight of the amidoalkyl vinyl ether. The polymerization is best carried out in an inert atmosphere such as nitrogen gas.

For polymerization in solution, concentrations of monomer from about 50% to about 90% are generally desirable. The course of polymerization may be readily followed from the increase in viscosity of the solution. The catalyst may be added in increments, if desired, with or without additional solvent.

A 50% aqueous solution of a water-soluble ureidoalkyl vinyl ether has a viscosity of less than $A_3$ on the Gardner-Holdt scale. After polymerization at 75° C. for 16 hours the viscosity is usually B to D, but may be carried to $Z_4$ as conversion is carried further.

Polymerization in dimethyl-formamide results in a conversion of monomer to polymer at least as high as in water and usually higher for a given amount of catalyst, but the polymer formed is of lower molecular size than polymers formed in water. For example, a 50% solution of ureidoethyl vinyl ether in dimethylformamide held at 75° C. for 16 hours readily develops a viscosity of G to I on the Gardner-Holdt scale, but conversion may be carried to a viscosity from D to $Z_4$. The polymer here is held in solution by the presence of monomer in the dimethylformamide, for after monomer and polymer are separated, the polymer does not redissolve in pure dimethylformamide.

For bulk polymerization the preferred temperatures are from about 70° to about 80° C. and the optimum proportion of catalyst is from 0.3% to 1% of the weight of the amidoalkyl vinyl ether. Under a nitrogen atmosphere a satisfactory degree of polymerization is obtained in 10 to 20 hours.

The homopolymers that result are generally soluble substances. The amidoalkyl vinyl ethers may also be copolymerized with monoethylenically unsaturated polymerizable compounds, such as vinyl chloride, vinyl bromide, vinyl iodide, 1,1-difluoroethylene, 1,1-dichloroethylene; vinylidene hydrocarbons such as isobutylene, 1,3-butadiene, styrene; halovinylidene hydrocarbons such as 2-fluoro-1,3-butadiene, 2-chloro-1,3-butadiene, 2,3-dichloro-1,3-butadiene; acrylic, haloacrylic and alkacrylic esters, nitriles and amides such as ethyl acrylate, methyl methacrylate, butyl methacrylate, methoxymethyl methacrylate, chloroethyl methacrylate, beta-diethylaminoethyl methacrylate, acrylonitrile, methacrylonitrile, acrylamide, methacrylamide; vinyl carboxylates such as vinyl formate, vinyl acetate, vinyl chloroacetate, vinyl butyrate, vinyl laurate; unsaturated aldehydes and ketones such as acrolein, methacrolein, methyl vinyl ketone; N-vinyl imides such as N-vinylphthalimide, N-vinylsuccinimide; unsaturated ethers such as vinyl ethyl ether, other vinyl monomers such as vinylpyridine; N-vinylcaprolactam; and other polymerizable or copolymerizable unsaturates such as tetrafluoroethylene, diethyl fumarate, dimethyl maleate and the like.

When a water-insoluble comonomer is copolymerized with the amidoalkyl vinyl ether, the copolymerization may be effected by means of an emulsion system using suitable emulsifying or dispersing agents such as the higher alkylaryl polyethoxyethanols such as the ethylene oxide modified alkyl phenols in which the alkyl group has from 8 to 18 or more carbon atoms such as octyl, dodecyl, and octadecyl, and which contain from 6 to 20 or more ethylene oxide units per molecule.

The amidoalkyl vinyl ether may also be copolymerized with polyethylenically unsaturated compounds including divinylbenzene, glycol dimethacrylate, trivinylbenzene, and N,N'-bis-vinoxyethylurea. Thereafter, the amido groups are hydrolyzed to leave amino groups in the polymer. Insoluble copolymers are thus obtainable even with a small proportion of the cross-linking monomer. Because of the high molecular weight obtained in such copolymers, a lower proportion of cross-linker is required in the final resin to produce and maintain insolubility after hydrolysis to produce free amine groups. Because of this, there is a greater ion-exchange capacity obtainable in the ultimate copolymer.

The hydrolysis of the polymer of the amidoalkyl vinyl ether may be effected under acid or alkaline conditions. An acid, such as hydrochloric, oxalic, or sulfuric may be used. Preferably an alkaline material such as the hydroxide or carbonate of ammonia, titanium, or an alkali metal, such as sodium or potassium, is used. Preferably the acid or alkali is introduced gradually into the hydrolysis medium to avoid any coagulation or precipitation of the polymer irreversibly. The hydrolysis may be effected at a temperature of 80° to 100° C., either in water or in aqueous alcohol mixtures. The period of hydrolysis may be from 1 to 16 hours, depending upon the extent of hydrolysis desired. When a homopolymer of an amidoalkyl vinyl ether is subjected to hydrolysis, the acyl groups may be completely removed by hydrolysis or only part of them may be removed if it is desired to produce a copolymer containing both amine and amido groups. Analogously, the hydrolysis of a binary copolymer of an amidoalkyl vinyl ether with a comonomer of another type may be carried out in such a manner as to remove only part of the acyl groups, thereby producing a ternary copolymer or complete hydrolysis of the acyl groups may be effected, thereby producing a different binary copolymer. In any event, the hydrolyzed polymer or copolymer contains monomeric units having the structure of Formula III (III)
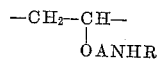

in which the symbols are as defined above.

The process of the present invention provides a practical and efficient way to produce high molecular weight aminoalkyl vinyl ethers. The homopolymers of such compounds are valuable as additives to paper, especially in the beater, for imparting improved wet strength to the ultimate paper produced. The higher the molecular weight of the polymer that is used for this purpose, the greater the wet strength obtained for a given amount of polymer added, or the lower the amount of additive needed to produce a given wet strength. This is generally true whether or not the addition is made with or without formaldehyde or with or without subsequent treatment of the wet paper sheet just prior to drying with formaldehyde. The polymers are useful as bactericides and fungicides, as well as for modifying the dyeing properties of films, sheets and other articles produced from compositions to which the aminoalkyl vinyl ether polymers are added. The polymers may be incorporated in films or sheets of hydrophilic type, such as regenerated cellulose, polyvinyl alcohol or cellulose acetate to provide permselective membranes. In all such applications wherein the polymer may be present within the body of a coating, a cast or extruded article, or the like, the polymers of higher molecular weight are less subject to loss or migration from the coating or formed article during use, especially under conditions wherein contact with aqueous solutions is encountered.

Various derative polymers can be obtained from the hydrolyzed amidoalkyl vinyl ether polymers by reaction with the amino groups obtained as a result of the hydrolysis. By this procedure N-substituted aminoalkyl vinyl ether polymers are obtained which could not be produced directly from corresponding N-substituted monomers because of the instability of such monomers or could not be produced in high molecular weights or with practical conversions from such corresponding N-substituted monomers of stable character. These derivative polymers which are hereinafter described include (1) certain polymeric N-vinyloxy alkyl carbamates and certain polymeric ureidoalkyl vinyl ethers which do not exist in monomeric form because of cyclization with consequent destruction of vinyl unsaturation; (2) certain polymeric sulfonamidoalkyl vinyl ethers which in monomeric form hydrolyze at the ether linkage because of inherent acidity when attempts are made to effect polymerization; and (3) polymeric aminoalkyl vinyl ethers having the N atom substituted with inhibiting groups such as benzyl, substituted benzyl, and nitrophenyl.

Carbamate derivatives, comprising polymerized N-vinyloxyalkyl carbamate units having the structure of Formula IV (IV)
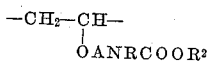

in which A and R are defined above and $R^2$ is allyl, phenyl, benzyl, cyclohexyl, or an alkyl group of 1 to 18 carbon atoms, may be obtained from those polymers of aminoalkyl vinyl ethers having monomeric units of Formula III by the reaction of the polymer with an alkyl chlorocarbonate in which the alkali group has from 1 to 18 carbon atoms, such as methyl, ethyl, isopropyl, dodecyl or octadecyl, in the presence of an acceptor of basic character, such as potassium carbonate, at temperatures of −10° to +20° C. in water or other aqueous media such as an aqueous alcohol solution. The reaction may be carried out for a period of 1 to 4 hours. One advantageous procedure is to hydrolyze the amidoalkyl vinyl ether in the presence of alkali at elevated temperatures, cool to below 20° C. and with excess alkali still present, add the alkyl chlorocarbonate and react for several hours at the low temperature. The products obtained are inherently film-forming in character and are quite useful as plasticizers for cellulose derivatives, such as cellulose acetate or cellulose acetate butyrate. The higher molecular weight polymeric carbamates thus obtained may be incorporated in spinning solutions of the cellulose derivatives, such as in acetone, acetonitrile, or dimethyl-formamide which may then be spun into suitable coagulating media, such as heated air or a water bath to form films, sheets, fibers or the like. A proportion of 5% to 15% of the carbamate polymer based on the weight of the cellulose ester may be used for this purpose. Analogous compounds made in the same way from the poly(aminoalkyl vinyl ether) but with an aryl chlorocarbonate, such as phenyl chlorocarbonate or p-chlorophenyl chlorocarbonate are valuable as plasticizers for vinyl resins, such as polyvinyl chloride, copolymers thereof with vinyl acetate, vinylidene chloride, acrylonitrile and the like. For these purposes, the high molecular weight of the polymeric carbamates serves to hinder diffusion of the polymer from plasticized masses containing them and from spinning or casting solutions containing them, whether of cellulose ester type or vinyl resin type. Those polymeric carbamates comprising units having the structure of Formula IV which have a hydrogen atom in the place of R cannot be obtained from the corresponding monomer because of cyclization as pointed out above.

Ureido derivative polymers comprising monomeric units having the structure of Formula V (V) 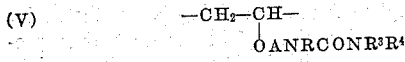

in which A is as defined above and $R^3$ and $R^4$ may be the same or different hydrocarbon substituents selected from the group consisting of cyclohexyl and alkyl groups having 1 to 18 carbon atoms, may be obtained from those polymers of aminoalkyl vinyl ethers having monomeric units of Formula III by the reaction of the polymer with a disubstituted carbamyl chloride such as dimethyl carbamyl chloride, diethyl carbamyl chloride, dipropyl carbamyl chloride, di-isopropyl carbamyl chloride, dibutyl carbamyl chloride, di-isobutyl carbamyl chloride, diamyl carbamyl chloride, dihexyl carbamyl chloride, dicyclohexyl carbamyl chloride, dioctyl carbamyl chloride, didecyl carbamyl chloride, didodecyl carbamyl chloride, dihexadecyl carbamyl chloride, dioctadecyl carbamyl chloride, ditetracosyl carbamyl chloride, methyl ethyl carbamyl chloride, methyl propyl carbamyl chloride, methyl isopropyl carbamyl chloride, methyl butyl carbamyl chloride, methyl cyclohexyl carbamyl chloride, methyl octadecyl carbamyl chloride, ethyl isopropyl carbamyl chloride, ethyl octyl carbamyl chloride, ethyl hexadecyl carbamyl chloride, butyl octadecyl carbamyl chloride, hexyl octyl carbamyl chloride. The reaction may be effected under anhydrous conditions in an inert solvent, such as toluene, with a basic acceptor for acids, such as excess of the polyamine or an inorganic base, such as sodium or potassium carbonates at a temperature of 20° to 80° C. When an inorganic base is used, water is preferably added to the inert solvent. As in the case of carbamate polymers, the ureido polymers having units of Formula I in which R is H cannot be produced from corresponding monomers because of their cyclization.

The polymers of aminoalkyl vinyl ethers, and especially the high molecular weight polymers obtainable in accordance with the present invention by the hydrolysis of amidoalkyl vinyl ethers, are also useful for the production of sulfonamide derivatives. Such poly(sulfonamides) comprise polymerized units having the structure of Formula VI (VI) 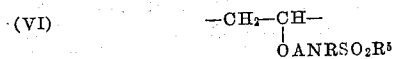

in which A and R are defined above and $R^5$ may be cyclohexyl, an alkyl group of 1 to 6 carbon atoms, such as methyl, ethyl, phenyl, alkylphenyl, such as tolyl, xylyl, chlorophenyl, dichlorophenyl, nitrophenyl, hydroxyphenyl, and the like. For making these poly(sulfonamides) the same procedures as outlined above in relation to the production of the carbamates are generally employed except that the chlorocarbonates are replaced with sulfonyl chlorides, such as methyl sulfonyl chloride, benzene sulfonyl chloride, and p-nitrobenzene sulfonyl chloride and so on. The sulfonamides of primary amines are generally soluble in alkaline medium, so they are generally isolated and/or purified by acidification to precipitate them from the alkaline medium. The resulting polymers may be of high molecular weight as pointed out above although certain of such high molecular weight polymers are not obtainable by the direct polymerization of the corresponding monomer; for example, those monomers corresponding to the polymerized units of Formula VI which have H as the substituent R hydrolize at the ether linkage because of inherent acidity when attempts are made to polymerize them; also N-methylnitrobenzenesulfonamidoalkyl vinyl ethers cannot be directly polymerized to high molecular weight polymers because of the inhibiting effect of the nitro group in monomers of this type. The polymeric sulfonamides obtained are useful as plasticizers for cellulose esters, such as cellulose acetate and the polyvinyl resins, such as copolymers of vinyl chloride or vinylidene chloride with vinyl acetate or acrylonitrile, having the same advantages of freedom from migration, etc. mentioned in connection with the poly(N-vinyloxyalkyl carbamates) above.

Under the same general conditions as used for making the poly(sulfonamides), the aminoalkyl vinyl ethers react with isocyanates, such as p-chlorobenzyl isocyanate, or p-nitrophenyl isocyanate to produce substituted ureas. As in the case of the p-nitrobenzene sulfonamide derivative just mentioned, high molecular weight polymers of these types can be obtained by the process of the present invention, whereas they could not be obtained by the direct polymerization of a corresponding monomer because of the inhibiting effect of the benzyl and nitro groups.

Ion-exchange resins may be obtained from the aminoalkyl vinyl ether polymers obtained by the process of the present invention by reacting such polymeric amines with polyisocyanates, such as p-toluene diisocyanate or polychlorocarbonates, for example, the bis-chlorocarbonate of diethylene glycol. The initial high molecular weight of the polymeric amine obtainable by the process of the present invention makes it possible to produce an ion-exchange resin with less of the polyfunctional cross-linkers, such as the diisocyanate, so that there is less decrease in the ion-exchange capacity by virtue of the amount of cross-linking agent present. Such resins may be used also to precipitate proteins or enzymes to isolate them from complex mixtures.

An alternative procedure for producing ion-exchange resins is to copolymerize about 80 to 95 mole percent of an amidoalkyl vinyl ether with 5 to 20 mole percent of a polyethylenically non-conjugated, unsaturated cross-linking monomer, such as bis-(vinyloxyethyl)urea, divinylbenzene, diethylene glycol dimethacrylate, divinyl-naphthalene, diallyl phthalate, divinyltoluene, trivinyl-benzene and any of the compounds listed in column 3, lines 10 to 44 of U. S. Patent 2,647,886; and then to hydrolyze the amide groups to amines. This procedure produces high molecular weight copolymers cross-linked to a condition of insolubility in organic and aqueous solvent media.

The following examples, in which the parts are by weight unless otherwise noted, are illustrative of the present invention. In the following examples, the copolymers designated Polymer B, D, F, and H respectively were soluble polymers higher in molecular weight than the corresponding homopolymers designated Polymer A, C, E, and G respectively. Polymer I is also an example of a soluble homopolymer which is readily hydrolyzable in accordance with the invention. Polymer J is an example of an insoluble cross-linked polymer which can be hydrolyzed to an insoluble ion-exchange resin.

*Example 1*

(a) *Polymerization of formamidoethyl vinyl ether—Polymer A.*—A solution of 100 grams of formamidoethyl vinyl ether and 0.5 gram of dimethyl azoisobutyrate was placed in a clean dry vessel previously flushed with nitrogen. The solution was heated to 75° C. whereupon polymerization began, the temperature rising to 100° C. as the result of the exotherm. After eight hours an additional 0.5 gram of initiator dissolved in 25 ml. of dimethylformamide was added with stirring to the mixture and the reaction was continued at 75° C. to make a total of 23 hours. The polymer was isolated by precipitation from solution with acetone and was drived at 60° C./0.2 mm. Hg to constant weight. A yield of 59 grams of viscous, water-soluble product was isolated. The molecular weight as determined in an osmometer was approximately 7500. A 50% aqueous solution had a Gardner-Holdt viscosity of B+ (0.75 poise).

(b) An aqueous solution of Polymer A containing 12.5% of polymer was heated to 85° C. and treated dropwise (while stirring) with a 50% solution of sodium hydroxide containing two moles of alkali per mole of amide. The addition was regulated so that complete solution was maintained. If polymer precipitated, addition was stopped until that polymer had redissolved. The mixture was heated for 12 hours at 85° C. after the addition and was ion-exchanged through a column containing both anion- and cation-exchange resins. The effluent solution was partially concentrated and analyzed for amine content by titration and determination of solids. The product was 86% hydrolyzed to the amine being essentially poly(aminoethyl vinyl ether).

(c) A solution of Polymer A, 23 grams, in a mixture of water and isopropanol (150 grams/40 grams) was heated and treated slowly with 80 grams of 25% sodium hydroxide. The solution was heated and stirred at reflux for 16 hours. The solution was adjusted to pH 5.0 with dilute sulfuric acid and then treated with 45 grams of lead oxide and stirred for one hour. The resultant alkaline slurry was filtered and concentrated at reduced pressure to dryness. The residue was leached with methanol and the methanol solution filtered and dried to give the product, poly(aminoethyl vinyl ether), 12.5 grams, containing approximately 0.8 mole of primary amine per mole of vinyl unit.

(d) A 20% aqueous solution of Polymer A, freed of monomer by extraction with benzene, was hydrolyzed by heating with 25% aqueous sulfuric acid at 100° C. for one hour. The solution was rendered alkaline with sodium hydroxide and treated with excess benzenesulfonyl chloride. The resultant sulfonamide was extracted with ethylene dichloride and purified by solution in alkali and reprecipitation with hydrochloric acid. The product was a brittle, tan solid at room temperature and melted at about 50° C. It contained 6.0% nitrogen and 12.6% sulfur, being thus largely poly(benzenesulfonamidoethyl vinyl ether). Over 80% of the available amide groups were hydrolyzed to amine groups. The incorporation of 5% to 20% of the poly(sulfonamide) product in copolymers of 80% to 95% vinyl chloride with 5% to 20% of vinyl acetate produces well-plasticized articles.

(e) The procedure of part (d) hereof was repeated substituting for the benzenesulfonyl chloride in successive operations, (1) 2,4-dichlorobenzenesulfonyl chloride and (2) p-nitrobenzenesulfonyl chloride. The products obtained served as stomach poisons for chewing insects, such as the armyworm.

(f) The procedure of part (d) hereof was repeated substituting for the benzenesulfonyl chloride in successive operations, (1) methylsulfonyl chloride and (2) cyclohexylsulfonyl chloride. The products were good plasticizers for copolymers of vinyl chloride and vinyl acetate when applied as in part (d) hereof.

*Example 2*

(a) *Copolymerization of formamidoethyl vinyl ether and N,N'-bis-vinyloxyethylurea—Polymer B.*—A mixture of 115 grams of formamidoethyl vinyl ether, 6.0 grams of N,N'-bis-(vinyloxyethyl)urea, 40 grams of dimethylformamide and 1.2 grams of dimethyl azoisobutyrate was slowly stirred in a nitrogen atmosphere and heated at 75° C. for 5½ hours. The soluble polymer was precipitated with acetone and dried well to give 96 grams (80% conversion) of glossy product corresponding to a copolymer consisting largely of units of formamidoethyl vinyl ether. A 25% aqueous solution had a Gardner-Holdt viscosity of I (2.25 poise) and an osmotic molecular weight of approximately 14,000.

(b) The polymer of part (a) hereof is hydrolyzed by the procedure of Example 1(b) except the time was 16 hours instead of 12 and the sodium hydroxide was added as a 25% solution although ratio of 2 moles of sodium hydroxide to one of the amide was adhered to. The extent of hydrolysis to amino units was 86%.

(c) The product of Example 2(b) was dried and dissolved in benzene and treated with a benzene solution of diisocyanato-phenyl methane containing 0.1 of the molar equivalent of the polyamine. The product that precipitated was washed and dried. It was a weak-base ion-exchange resin with a capacity of 4.0 meq./g.

*Example 3*

(a) *Polymer C.*—By the procedure of Example 1(a) used to make Polymer A, acetamidoethyl vinyl ether was polymerized to poly-(acetamidoethyl vinyl ether) (obtained in 92% conversion) with 2% by weight of dimethyl azoisobutyrate at 75° C. for 16 hours. A 25% aqueous solution had a Gardner-Holdt viscosity of A–1.

(b) The polymer of part (a) hereof is hydrolyzed by the procedure of Example 1(b) except the time was 16 hours instead of 12. The extent of hydrolysis to amino units was 84%.

(c) The polyamine of Example 3(b) obtained in the anhydrous state by freeze-drying was dissolved in dry benzene and treated with an equivalent quantity of p-nitrophenyl isocyanate in benzene. The product, poly-(p-nitrophenylureidoethyl vinyl ether), precipitated and was isolated by filtration.

The product is useful as an insecticide, particularly as a stomach poison in the control of chewing insects such as the armyworm.

*Example 4*

(a) *Polymer D.*—A copolymer of 97 mole percent of acetamidoethyl vinyl ether and N,N'-bis-vinyloxyethylurea containing 3 mole percent of the latter was prepared in 84% conversion by the procedure of Example 2(a) used for making Polymer B.

(b) The polymer of part (a) hereof is hydrolyzed by the procedure of Example 1(b) except the time was 16 hours instead of 12 and the sodium hydroxide was added as a 25% solution although ratio of 2 moles of sodium hydroxide to one of the amide was adhered to. The extent of hydrolysis to amino units was 84%.

(c) The polyamine of Example 4(b) in a mixture of benzene and water containing an equivalent molar quantity of potassium carbonate was treated with a molar equivalent of allyl chlorocarbonate at 0 to 5° C. The resultant product, poly(allyl N-vinyloxyethylcarbamate), was isolated from the benzene layer by drying and concentration. The product was a viscous material which could be readily formulated into compositions useful for film-formation. The resultant films could be thermoset by baking in the presence of air. This process was facilitated and made more efficient by the incorporation of metallic driers such as cobalt or manganese naphthenate. The resultant films were tough and completely resistant to water, soap and common solvents.

(d) In place of the chlorocarbonate of Example 4(c) there was substituted an equivalent quantity of dimethylcarbamyl chloride and the reaction was conducted at 30° to 40° C. The product was a viscous, resinous mass that was useful as a plasticizer for cellulose esters such as acetate or butyrate or combinations thereof. It was also useful as a plasticizer for copolymers of acrylonitrile such as one comprising 70 parts of acrylonitrile and 30 parts of ethyl acrylate. The product was characterized by permanence, lack of migration and good low-temperature properties.

Example 5

(a) *Polymer E.*—A polymer of N-methylformamidoethyl vinyl ether prepared by the procedure of Example 1(a) used for making Polymer A was obtained in 90% conversion.

(b) The polymer of part (a) hereof is hydrolyzed by the procedure of Example 1(b) except the time was 72 hours instead of 12 and the sodium hydroxide was added as a 25% solution although ratio of 2 moles of sodium hydroxide to one of the amide was adhered to. The extent of hydrolysis to amino units was 64%.

(c) The polyamine of Example 5(b) in aqueous solution was treated with an equivalent quantity of benzyl chloride and sodium hydroxide, the chloride and hydroxide being added alternately in small portions. The mixture was maintained at 80° C. during the additions and for 4 hours thereafter. The product, which was isolated by extraction with benzene was essentially the polymeric tertiary amine, poly(N-benzyl-N-methylaminoethyl vinyl ether).

This material is an active fungicide giving complete control of both *Monilinia fructicola* and *Stemphylium sarcinaeforme* at concentrations of 0.1% or less.

Example 6

(a) *Polymer F.*—A copolymer of 98 mole percent of N-methylformamidoethyl vinyl ether and 2 mole percent of N,N'-bis-(vinyloxyethyl)urea made by the procedure used for making Polymer B was obtained in 95% conversion.

(b) The polymer of part (a) hereof is hydrolyzed by the procedure of Example 1(b) except the time was 72 hours instead of 12 and the sodium hydroxide was added as a 25% solution although ratio of 2 moles of sodium hydroxide to one of the amide was adhered to. The extent of hydrolysis to amino units was 66%.

Example 7

(a) *Polymer G.*—A 50% aqueous solution of 2-ureidoethyl vinyl ether was mixed with 1% by weight of dimethyl azoisobutyrate and allowed to polymerize at 75° C. for 16 hours. The polymer was isolated as a solid by precipitation with acetone and drying. A 50% aqueous solution of purified polymer had a Gardner-Holdt viscosity of U (6.3 poises) and an osmotic molecular weight of 50,000.

(b) A solution of 40 grams (0.3 mole) of Polymer G in 200 ml. of water was heated to reflux and treated slowly with a solution of 25 grams of sodium hydroxide in 270 ml. of water. The reaction was continued for 24 hours. The ammonia evolved during the reaction, was collected and titrated and found to be 90% of theory. The mixture was purified by treatment with a sulfonic acid ion-exchange resin in the acid form and concentrated at reduced pressure. The concentrated residue was frozen and dried in vacuo to give 33 grams of fine powder readily soluble in water. In contained 11.8% nitrogen equivalent to 73.5% of the theoretical primary amine groups. Its approximate average molecular weight was 20,000. This material is an extremely effective bactericide and in addition gives 100% control of Coli T6, Streptococcus 7 and Staphylococcus P1 phage strains.

(c) Handsheets were prepared from bleached and unbleached pulps each containing 2% of the indicated resin added to the beater. The pulps were each at pH 6.9. The sheets were then examined for wet-tensile strength by the usual procedure.

| Resin | Wet Tensile (7 days), lbs./in. width | |
|---|---|---|
| | Unbleached Kraft | Bleached Kraft |
| 1. Product of part (a) hereof | 8.0 | 4.2 |
| 2. Poly(aminoethyl vinyl ether)* | 3.2 | 1.5 |
| 3. None | .5 | .5 |

*Polymer prepared by direct polymerization of aminoethyl vinyl ether with an azo catalyst and consequently of low average molecular weight.

Example 8

(a) *Polymer H.*—A copolymer containing 99 mole percent of 2-ureidoethyl vinyl ether and 1 mole percent of N,N'-bis-vinyloxyethylurea was prepared by the same procedure as that used for making Polymer G. The copolymer had an osmotic molecular weight of 80,000.

(b) The polymer of part (a) hereof was hydrolyzed by the procedure of Example 7(b). The extent of hydrolysis was about 71%.

Example 9

(a) *Polymer I.*—A polymer of 2-ureidoethyl vinyl ether was prepared by heating a 50% solution of monomer in dimethylformamide at 75° for 16 hours with 1% by weight of dimethyl azodiisobutyrate. The purified polymer had an osmotic molecular weight of 20,000.

(b) The polymer of part (a) hereof was hydrolyzed by the procedure of Example 7(b). The extent of hydrolysis was about 80%.

Example 10

Films of cellulose acetate were prepared containing 10% by weight of the polymer of Example 2(b) in one case (film I) and the polymer of Example 5(b) in the second (film II). Each was dyed with a direct, acid, blue dye. The films were tested for re-solubility in acetone, for dye-pickup, and for cycles of resistance in a conventional gas-fade testing chamber. The results are tabulated in the following table:

| | Percent Soluble in Acetone | Dye Pickup | Gas-Fade Cycles |
|---|---|---|---|
| Control | >90 | 10 | <1 |
| Film I | 57 | 44 | 3 |
| Film II | 57 | 61 | 9 |

Example 11

(a) *Polymer J.*—A mixture of 20 grams of formamidoethyl vinyl ether, 2 grams of divinylbenzene, 1.0 gram of dimethyl azoisobutyrate, and 20 ml. of toluene was heated at 65° C. for 20 hours. A yield of 9.5 grams of insoluble material corresponding to a copolymer of the two monomers was obtained.

(b) Half of the product of part (a) hereof was hydrolyzed by refluxing with aqueous sulfuric acid and another half was hydrolyzed by refluxing with sodium hydroxide. The resultant products in which over 60% of the available amide groups were hydrolyzed to amine groups were useful as ion-exchange resins, each having about 2.0 meq. of weak base capacity/g.

Other preparations similarly obtained varied in activity from 1.5/g. to >3 meq./g. depending on the amount of divinylbenzene and the degree of hydrolysis obtained.

I claim:

1. A composition of matter comprising an addition polymer of olefinically unsaturated molecules comprising a predominant proportion of benzenesulfonamidoethey vinyl ether.

2. A composition of matter comprising an addition polymer of olefinically unsaturated molecules comprising a predominant proportion of 2,4-dichlorobenzenesulfonamidoethyl vinyl ether.

3. A composition of matter comprising an addition polymer of olefinically unsaturated molecules comprising a predominant proportion of p-nithrobenzenesulfonamidoethyl vinyl ether.

4. A composition of matter comprising an addition polymer of olefinically unsaturated molecules comprising at least 80 mole percent of benzenesulfonamidoethyl vinyl ether.

5. As a composition of matter, an addition polymer which comprises recurring structural units of the formula $$-CH_2-CH-$$
$$\quad\quad |$$
$$\quad\quad OANRSO_2R^5$$

wherein A is an alkylene group of 2 to 3 carbon atoms of which at least two separate the adjoining O and N atoms, R is selected from the group consisting of hydrogen and methyl, and $R^5$ is selected from the group consisting of cyclohexyl, alkyl groups having 1 to 6 carbon atoms, phenyl, and phenyl groups substituted by a member selected from the group consisting of chlorine and methyl, nitro, and hydroxyl groups.

References Cited in the file of this patent

UNITED STATES PATENTS

| | | |
|---|---|---|
| 2,098,108 | Reppe et al. | Nov. 2, 1937 |
| 2,544,638 | Caldwell | Mar. 13, 1951 |
| 2,550,767 | Buckley et al. | May 1, 1951 |
| 2,576,502 | Dalton | Nov. 27, 1951 |
| 2,576,839 | Jones | Nov. 27, 1951 |
| 2,601,251 | Bruson | June 24, 1952 |
| 2,734,891 | Melamed | Feb. 4, 1956 |
| 2,806,840 | Aycock et al. | Sept. 17, 1957 |